United States Patent [19]

Coxhead et al.

[11] Patent Number: 5,169,705
[45] Date of Patent: Dec. 8, 1992

[54] SERVO ELECTRIC DRIVEN STRETCH RODS FOR BLOW MOLDING MACHINE

[75] Inventors: Bruce Coxhead, Bond Head; Tom Van Leeuwen, Mississauga, both of Canada

[73] Assignee: Husky Injection Molding Systems Ltd., Bolton, Canada

[21] Appl. No.: 807,178

[22] Filed: Dec. 16, 1991

Related U.S. Application Data

[63] Continuation of Ser. No. 685,288, Apr. 15, 1991, abandoned, which is a continuation-in-part of Ser. No. 655,125, Feb. 14, 1991, abandoned.

[51] Int. Cl.⁵ .............................................. B29C 49/12
[52] U.S. Cl. .................................. 425/150; 425/529; 425/530; 425/535
[58] Field of Search ............. 425/529, 530, 535, 534, 425/150; 264/529, 532

[56] References Cited

U.S. PATENT DOCUMENTS

| | | | |
|---|---|---|---|
| 4,009,980 | 3/1977 | Armour et al. | 425/529 X |
| 4,036,925 | 7/1977 | Kauffman et al. | 425/529 X |
| 4,128,383 | 12/1978 | Bond et al. | 425/529 |
| 4,177,239 | 12/1979 | Gittner et al. | 264/532 X |
| 4,285,657 | 8/1981 | Ryder | 425/535 X |
| 4,304,542 | 12/1981 | Sauer | 425/535 X |
| 4,354,813 | 10/1982 | Collombin | 425/534 X |
| 4,522,581 | 6/1985 | Schad et al. | 425/534 |
| 4,540,543 | 9/1985 | Thomas et al. | 425/535 X |
| 4,690,633 | 9/1987 | Schad et al. | 425/534 X |
| 4,818,212 | 4/1989 | Gibbemeyer | 425/529 |

*Primary Examiner*—Richard L. Chiesa
*Attorney, Agent, or Firm*—Bachman & LaPointe

[57] ABSTRACT

Apparatus includes a blow mold, a holding device for holding the parison within the blow mold, a blow device for forming a blown article in the blow mold and a stretch rod for stretching the parison movable in the holding device. A device is provided for determining the position of the stretch rod in the holding device channel and for synchronizing the transmission of high pressure fluid to the parison based on the position of the stretch rod.

18 Claims, 6 Drawing Sheets

SERVO ELECTRIC DRIVEN STRETCH RODS FOR BLOW MOLDING MACHINE

CROSS-REFERENCE TO RELATED APPLICATIONS

This application is a continuation of U.S. patent application Ser. No. 685,288, filed Apr. 15, 1991, now abandoned, which in turn is a continuation-in-part of U.S. patent application Ser. No. 655,125, filed Feb. 14, 1991 entitled SERVO ELECTRIC DRIVEN STRETCH RODS FOR BLOW MOLDING MACHINE, By Bruce Coxhead and Tom Van Leeuwen, now abandoned.

BACKGROUND OF THE INVENTION

Plastic parisons or preforms are conventionally reheated and formed into hollow plastic articles by stretch blow molding in a blow mold using a stretch rod and high pressure fluid.

The preforms are preheated in ovens immediately prior to being transferred into a blow mold. Incorporated with the blow mold are stretch rods which typically enter the preform from its open end and extend during the blow stage to cause biaxial orientation of the blown article. The motion of the stretch rod should be synchronized with the blowing of the high pressure fluid so that the preform is stretched along its longitudinal axis by the rod and simultaneously or sequentially stretched perpendicular to this axis by the pressure of the incoming fluid to orient its molecules for greater strength.

Stretch rods have been typically moved mechanically with cams driven by a motor or by direct actuation of hydraulic cylinders. Both these methods while offering some degree of control of the speed of the stretch rod motion and the rate of change of this speed during the stretch rod stroke are not easily or accurately able to synchronize this motion with the blowing action.

Stretch blow molding machines are shown in U.S. Pat. Nos. 4,522,581, 4,690,633, 4,128,383 and 4,818,212. The apparatus described in U.S. Pat. No. 4,690,633 carries preforms on pallets from a loading station to a finishing or blowing station via a conditioning station. The preform is blown at the blowing station and then the blown article moved to an unloading station.

Accordingly, it is a principal object of the present invention to provide an apparatus for forming a stretch blow molded hollow plastic article.

It is a further object of the present invention to provide an apparatus as aforesaid which synchronizes the motion of the stretch rod with the blowing of the high pressure fluid into the preform, and which can do this in an efficient and reliable manner.

Further objects and advantages of the present invention will appear hereinbelow.

SUMMARY OF THE INVENTION

In accordance with the present invention, the foregoing objects and advantages are readily obtained. The apparatus of the present invention comprises: a blow mold for forming a blown article from a parison; holding means for holding the parison within the blow mold including channel means within the holding means communicating with the parison; blow means having a channel communicating with the parison for transmission of high pressure fluid to the parison to expand the parison into conformity with the blow mold and form a blown article therein; a source of high pressure fluid communicating with the blow means; a stretch rod for stretching the parison movable in the holding means channel; means for moving the stretch rod in the holding means channel; means for determining the position of the stretch rod in the holding means channel and means for synchronizing the transmission of high pressure fluid to the parison based on the position of the stretch rod in the holding means channel.

In the preferred embodiment, the means for moving the stretch rod is a servo electric drive which has been found to obtain significant advantages. In particular the rods can be moved with a rate of change of speed which is accurately programmable and synchronizable to the blowing operation taking place in the blow mold. The accuracy of motion achieved surpasses prior art means, cams and cylinders, and is also much more repeatable from one cycle to the next. In addition to accuracy and repeatability another advantage of this drive means is its ability to be easily reconfigured for a different speed profile for blowing a different article. Reprogramming the motor controller is all that is required, whereas prior art cam and cylinder means required mechanical changes to the stretch rod drive means hardware and/or complicated resequencing of hydraulic valving requiring a trial and error approach before satisfactory conditions are set.

Further objects and advantages of the present invention will appear herein.

BRIEF DESCRIPTION OF THE DRAWINGS

The present invention will be more readily understandable from a consideration of the accompanying drawings, wherein.

DESCRIPTION OF THE PREFERRED EMBODIMENTS

Figure 1:
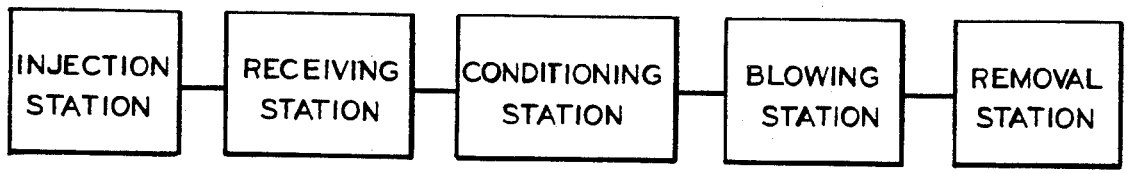
FIG. 1 is a block diagram showing the stations through which the parisons pass.

Referring to the drawings, FIG. 1 shows in a block diagram the preferred cycle from injection station where the parisons or preforms are prepared, to receiving station where they are transferred to mandrels, preferably by a robot, to temperature conditioning station where the temperature is adjusted so as to be suitable for blowing and biaxial orientation, to the blowing station, and finally to the blown article removal station. The cycle is shown in U.S. Pat. No. 4,690,633, the disclosure of which is hereby incorporated by reference. The particular features of the overall cycle are not critical to the present invention. Thus, one can readily use an apparatus as shown and described in U.S. Pat. No. 4,690,633. The parisons may or may not be prepared in-line with the other operations and may readily be made at a different time. The transfer path may take the form of an oval path, a straight path, or a horse-shoe shaped path, or any convenient configuration.

The apparatus of the present invention is directed to the movement of the stretch rod in the parison and the synchronization of the transmission of high pressure fluid to the parison based on the position of the stretch rod during its movement cycle. For example, it is desirable to activate the high pressure blowing of the preform at any stage of the stretching process, repeatably. This will enable process time savings. Also, the high pressure blow air valve response time should be taken into account so that full blow pressure is applied nearly as soon as full stretch rod stroke is achieved. It may also be desirable to apply full blow pressure well before the stretch rods reach their full stroke. The foregoing are readily accomplished in accordance with the present invention.

Figure 2:
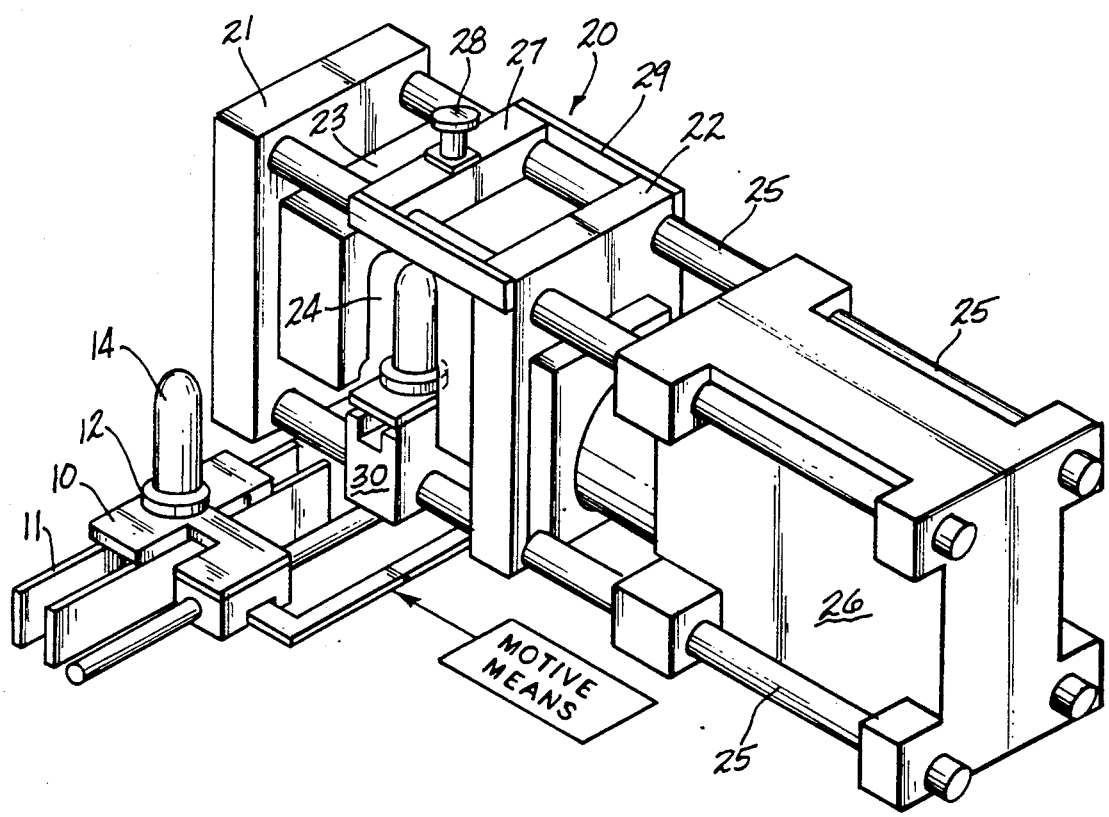
FIG. 2 is an isometric view of the finishing station.

FIG. 2 is a schematic view of the holding means with parison thereon aligned and ready to be received by the blow mold. FIG. 2 shows a single holding means or mandrel carrying a single parison; however, it should be understood that the present invention may readily be used when the mandrel carries a plurality of parisons or when a plurality of mandrels carry a plurality of parisons. For convenience, in the following discussion, the present invention has been described with a single holding means or mandrel carrying a single parison.

Referring to FIG. 2, pallets 10 are retained in channel track 11 having been transferred thereto from the conditioning station by means not shown. Pallets 10 hold rotatable mandrels 12 which in turn hold parisons or preforms 14 via projection 13, shown more clearly in FIGS. 3 and 4. The particular parison shape is representative only and any suitable shape can be used. The parison and mandrel arrives at the blowing station after traversing a conditioning station on a rotating mandrel as described in the aforesaid U.S. Pat. No. 4,690,633.

Blowing station or finishing station 20 includes fixed platen 21 and movable platen 22 with blow mold 23 therebetween containing a mold 24 in the shape of the hollow article to be formed. Movable platen 22 moves on tie rods 25 activated by motor 26. Base mold 27 is positioned above mold 24 to form the article bottom with piston 28 connected thereto for moving the bottom mold into appropriate alignment for formation of the desired base for the article and motive means (not shown) connected thereto for activating said piston. Linkage means 29 are provided connected to the movable platen 22 and bottom mold 27 in order to maintain the desired positioning thereof. For clarity only the top linkage means are shown in FIG. 2. Channel track 30 sits spaced from but closely adjacent to channel track 11 so that pallets 10 can readily move into position in the blow mold. Pallets 10 may include depending leg or spindle 38 (shown in FIGS. 3-4) which may be engaged by a chain link (not shown) or any desired motive means for moving the pallet. As shown in FIG. 2, one mandrel-parison assembly is in position in the blow mold while a second is ready to be moved into the blow mold.

Figure 3:
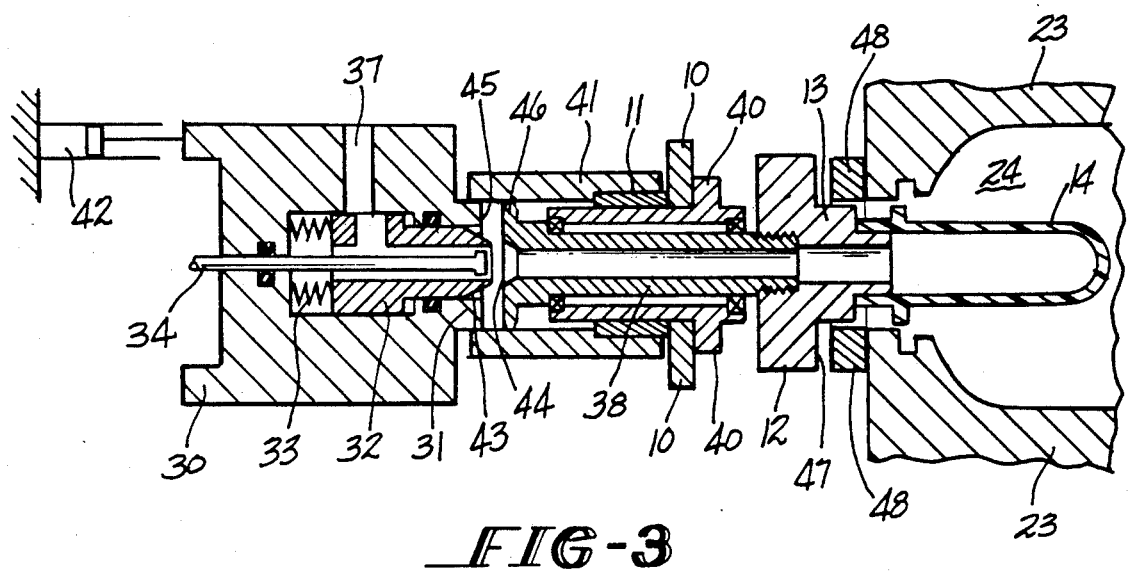
FIGS. 3 and 4 are sectional views showing the mandrel, nozzle and stretch rod in different stages of operation.
Figure 4:
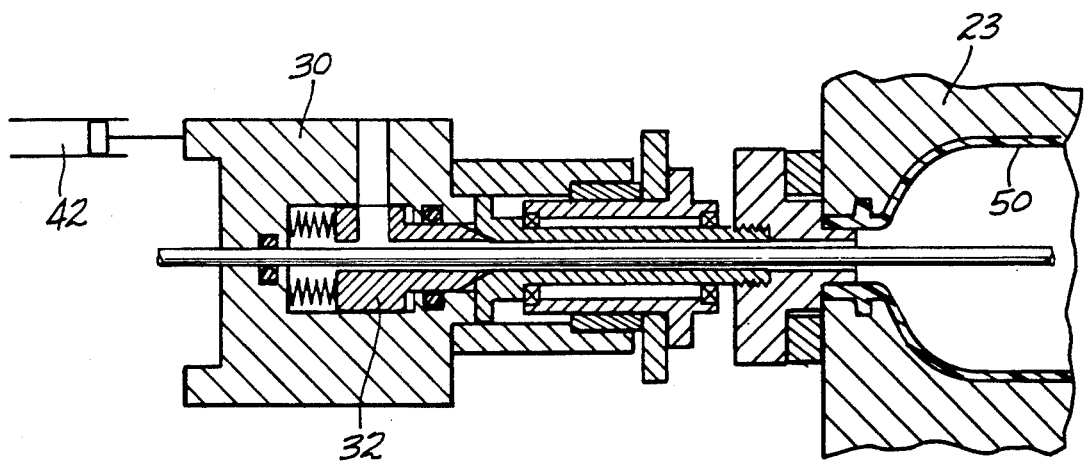

FIGS. 3-4 are sectional views showing the nozzle, the mandrel and the stretch rod in different stages of operation.

Thus, as shown in FIG. 3, pallets 10 with mandrels 12 and parisons 14 thereon are brought into an aligned position with blow mold 23. The nozzle assembly includes movable support block 30 including collar 31 fastened thereto. The support block carries slidable nozzle 32 which is urged in a forward position by springs 33 or other suitable means. Movable stretch rod 34 passes through the center of nozzle 32. The entire block-nozzle assembly can be moved toward and away from the pallet-mandrel assembly by cylinder means 42. High pressure blowing air is supplied through channel 37.

Pallet 10 carries pallet block 40 and mandrel spindle 38 to which is threaded mandrel 12. Thus, the mandrel spindle 38 is connected to and depends from mandrel 12. The pallet 10 (including mandrel) is guided between tracks 11 mounted on base 41 and is positioned to line up the axis of the mandrel 12 with the axis of the stretch rod.

In FIG. 4 with the pallet in position, cylinder means 42 advances support block 30 so that tapered sealing surface 43 of nozzle 32 contacts corresponding tapered sealing surface 44 of spindle 38. This forward motion is limited by substantially flat contact surface 45 of collar 31 contacting the rear corresponding substantially flat contact surface 46 of spindle 38. Thereafter, the nozzle and spindle continue to be urged forward by the springs until, substantially flat mandrel contact surface 47 contacts the corresponding substantially flat blow mold frame stop 48. Thus, during this closing motion, nozzle 32, urged forward by springs 33, contacts the spindle sealing surface 44 with the corresponding tapered sealing surfaces. In FIG. 4, the blow mold 23 is closed and the stretch rod 34 is advanced and high pressure air is supplied through channel 37 to inflate the parison and form finished article 50, in conformity with mold 24.

Figure 5:
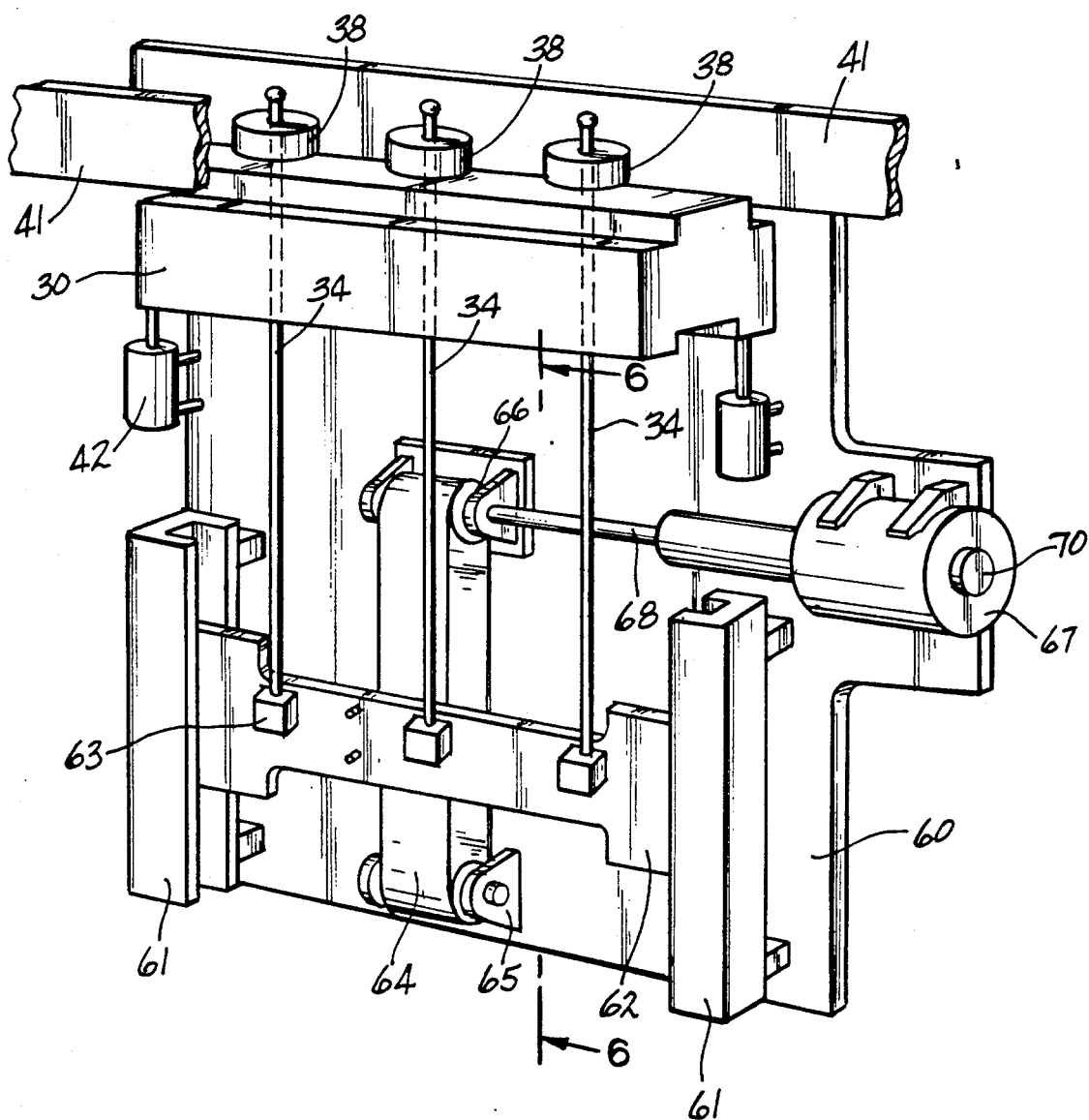
FIG. 5 is a perspective view of the stretch rod assembly and nozzle assembly support block, with portions broken away.
Figure 6:
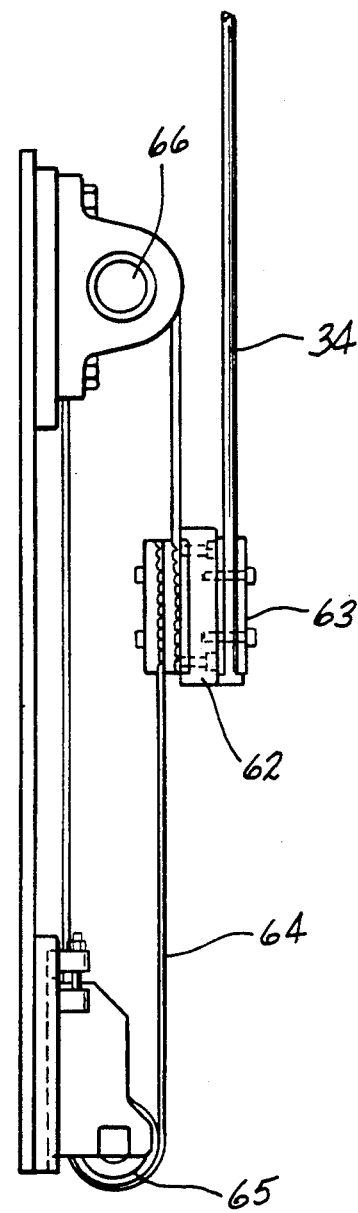
FIG. 6 is a sectional view along lines 6—6 of FIG. 5.

FIGS. 5-6 show details of the stretch rod assembly. As shown clearly in FIG. 5, machine base 60 carries guides 61. The stretch rod mechanism includes sliding plate 62 which carries mounting blocks 63. Stretch rods 34 are mounted in mounting blocks 63 and move with the movement of the sliding plate. Three stretch rods are shown in this embodiment, but the present invention is not limited to a specific number of stretch rods and more or less may be used based on particular design requirements.

The drive means for plate 62 includes belt 64 passing over adjustable pulley 65 and drive pulley 66. Drive pulley 66 is connected to servo electric motor 67 via drive shaft 68. Operating the motor causes plate 62 and the stretch rods 34 mounted thereon to move towards and away from blow mold 23 (FIGS. 2-4). In particular the rods can be moved upward with a rate of change of speed which is accurately programmable and synchronizable to the blowing operation taking place in the blow mold above. The accuracy of motion achieved surpasses prior art means, cams and cylinders, and is also much more repeatable from one cycle to the next.

In addition to accuracy and repeatability another advantage of this drive means is its ability to be easily reconfigured for a different speed profile for blowing a different article. Reprogramming the motor controller is all that is required, whereas prior art cam and cylinder means required mechanical changes to the stretch rod drive means hardware and/or complicated resequencing of hydraulic valving requiring a trial and error approach before satisfactory conditions are set.

Figure 7:
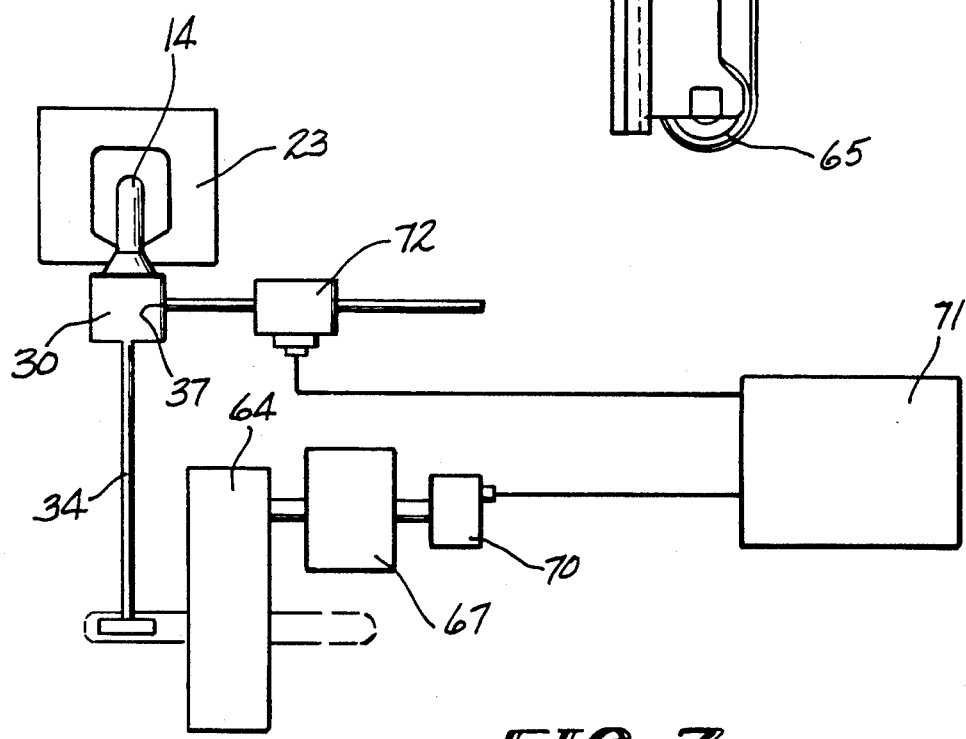
FIG. 7 is a schematic representation of the stretch rod—high pressure air blowing control system.

FIG. 7 is a schematic representation of the stretch rod—high pressure air blowing control system. Basically, an encoder 70 (shown in FIGS. 5 and 7) signals the stretch rod position to a programmable controller 71 which then commands a high pressure inlet valve 72 served by a high pressure air supply (not shown) to admit blowing air via channel 37 to inflate parison 14 in blow mold 23 as shown in FIGS. 3-4. This can be accurately programmed to occur at a predetermined stretch rod position during the stretch blowing of the part and can be optimized to produce a better product.

Thus, the signal from the servo motor's encoder will be used as feedback to the programmable controller as to when to activate the high pressure blow air valves. With feedback, position of the stretch rods is known at all times and it will be possible to activate the high pressure blowing of the preform at any stage of the stretching process repeatably. This knowledge will allow process time savings. For example, the high pressure blow air valve's response time could be taken into account so that the full blow pressure is applied nearly as soon as full stroke is achieved. This could be accomplished by activating the high pressure blow air valve when the stretch rods are a given distance (and time) away from full stroke.

It is also possible that full blow pressure may be applied well before the stretch rods reach their full stroke with no loss in final container properties.

Figure 8:
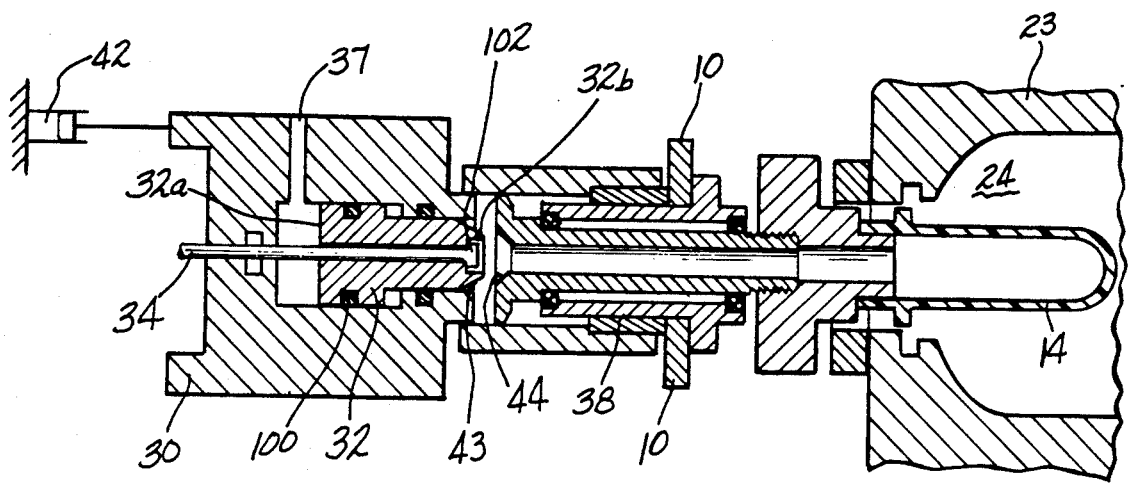
FIGS. 8, 9 and 10 are sectional views showing alternate embodiments of the present invention.
Figure 9:
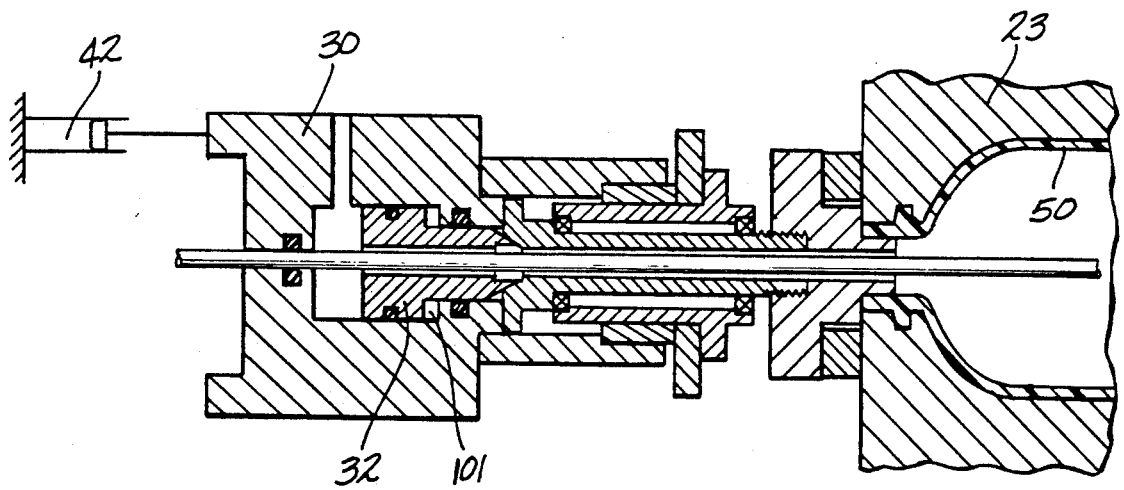

An alternate embodiment of the present invention is shown in FIGS. 8 and 9. FIGS. 8 and 9 are similar to FIGS. 3 and 4 and like numerals have been used to designate like parts. In FIGS. 3 and 4 spring 33 urges nozzle 32 forward into engagement with spindle 38. In accordance with FIGS. 8 and 9, spring 33 has been eliminated. This function is now performed by making back portion 32a of nozzle 32 act as an air piston. Thus, high pressure air is supplied through channel 37 upstream of nozzle 32 and acts on back portion 32a of nozzle 32 to urge the nozzle into engagement with spindle sealing surface 44 as shown in FIG. 9. Seal 100 is provided between nozzle 32 and support block 30. Thus, when cylinder 42 moves support block 30 toward blow mold 23, tapered sealing surface 43 of nozzle 32 engages the matching surface 44 in mandrel spindle 38 forming an air tight seal. Nozzle 32 does not bottom out in support block 30 as evidenced by clearance 101 between the nozzle and the support block so that fluid pressure from channel 37 constantly urges nozzle 32 into contact with spindle 38. Air pressure for inflating the parison as shown in FIG. 9 is supplied at a higher pressure than that used to move the nozzle, for example, compressed air to move the nozzle may be supplied at a nominal 80 psi and compressed air to inflate the parison at a nominal 700 psi.

In addition, stretch rod 34 includes an enlarged head portion 102 and nozzle 32 has a recessed head portion 32b. Thus, in the disengaged or retracted position as shown in FIG. 8, head 102 on stretch rod 34 engages recessed nozzle head portion 32b and thereby insures that nozzle 32 is fully retracted to permit pallet 10 to be shuttled. If the nozzle were not completely retracted, then interference between the nozzle and the mandrel spindle would jam the mechanism and cause damage. Although cylinder 42 is designed to retract support block 30 far enough to clear the nozzle, this may not occur quickly enough, or cylinder 42 may stick or only partially move, thus permitting interference to occur. By adding the enlarged head portion to the stretch rod and causing it to positively retract the nozzle within the support block before permitting shuttling to proceed, a useful safeguard is provided to prevent damage. This is facilitated by the fact that the stretch rod is servo driven and can not only have programmed motion forward (stretching) but also backward in its withdrawal phase.

Figure 10:
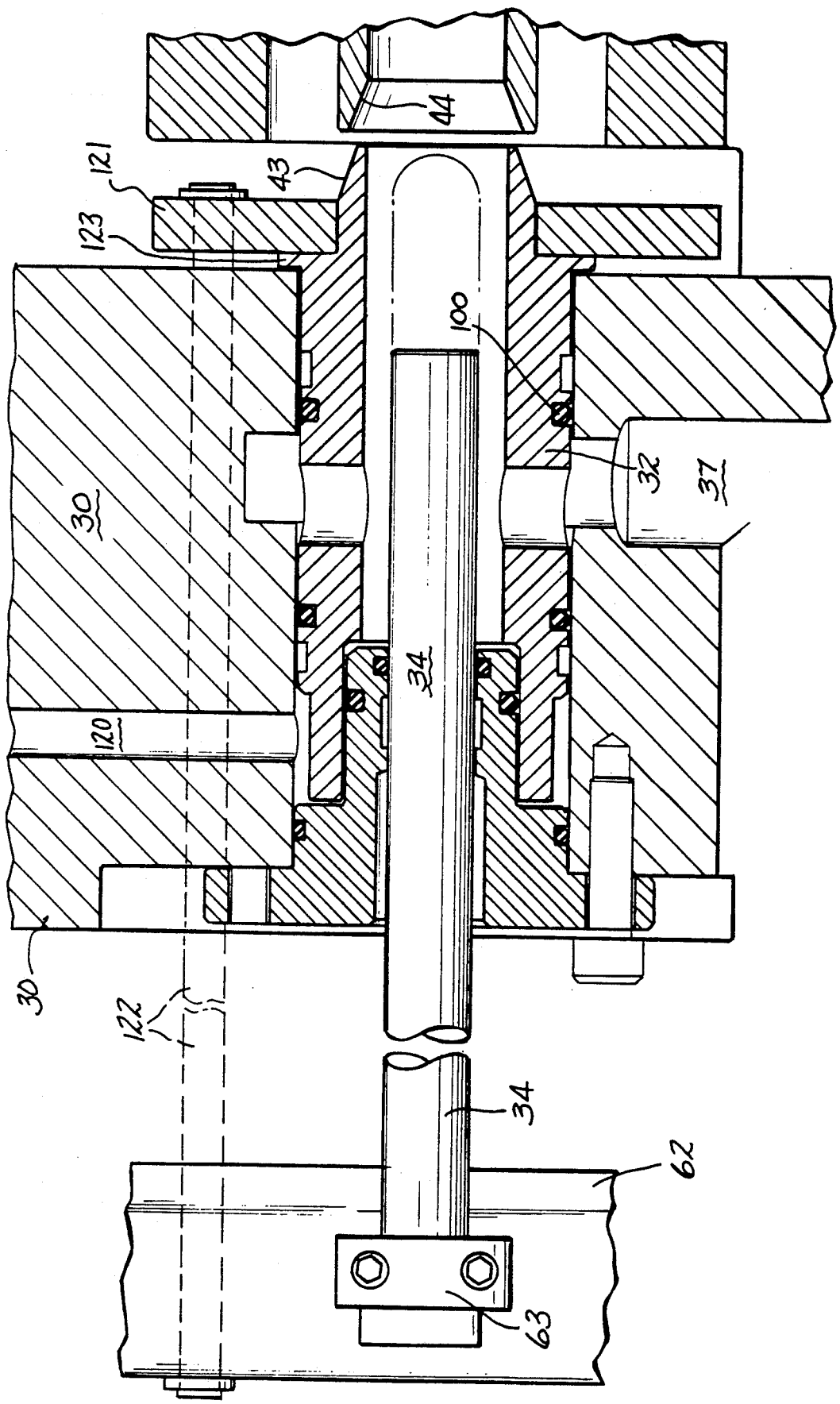

The embodiment of FIG. 10 is similar to FIGS. 3-4 and like numerals have been used to designate like parts. The embodiment of FIG. 10 eliminates cylinder means 42 and also eliminates the motion of support block 30. Support block 30 is now fixed and only nozzle 32 moves to engage spindle 38. Thus, referring to FIG. 10, nozzle 32 slides in support block 30. Tapered sealing surface 43 of nozzle 32 is moved into engagement with tapered sealing surface 44 by compressed air supplied via channel 120 at, for example, a nominal 80 psi to cause nozzle 32 to move into engagement with spindle 38. Once engaged, high pressure blowing fluid (for example at a nominal 700 psi) is supplied through channel 37 and with the motion of stretch rod 34 causes the preform to be inflated inside the closed blow mold as with the other embodiments. After blowing is complete, the stretch rod 34 is retracted by the downward motion of sliding plate or beam 62 onto which rod 34 is fastened by mounting blocks or clamps 63 as described hereinabove. To insure that nozzle 32 is also retracted and fully disengaged from spindle 38, plate means 121 engages nozzle 32 and is affixed to forward shoulder 123 of nozzle 32. Plate 121 engages tie rod 122 which in turn is affixed to beam 62 whereby the plate means and tie rod are operative to move the nozzle out of engagement with the mandrel with the movement of beam 62. Thus, the embodiment of FIG. 10 enables the stretch rod to have a smooth spherical tip if desired as shown in FIG. 10 and also eliminates the movement of support block 30.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for forming a hollow plastic article, which comprises:

a blow mold for forming a hollow plastic article from a parison;

holding means for holding the parison within the blow mold including channel means within the holding means communicating with the parison;

blow means having a channel communicating with the parison for transmission of high pressure fluid to the parison to expand the parison into conformity with the blow mold and form a blown article therein;

means for transmitting fluid pressure to the blow means;

a stretch rod for stretching the parison movable in the holding means channel from a retracted position outside the blow mold to a forward position within the blow mold;

a servo electric drive for moving the stretch rod in the holding means channel separate from the high pressure fluid operative to move the stretch rod with a programmable rate of change of speed while the parison is in the blow mold;

means for determining the position of the stretch rod in the holding means channel operatively connected to said servo electric drive; and a programmable controller means operatively connected to the means for determining the position of the stretch rod and to the means for transmitting fluid pressure for synchronizing the movement of the stretch rod and the transmission of high pressure fluid to the parison based on the position of the stretch rod in the holding means channel to synchronize the movement of the stretch rod with the transmission of high pressure fluid while the parison is being expanded into conformity with the blow mold wherein the servo electric drive operatively moves the stretch rod with a rate of change of speed which is synchronized to the blowing operation.

2. Apparatus according to claim 1 wherein the holding means is a mandrel.

3. Apparatus according to claim 2 wherein the blow means is a blow nozzle engagable with the mandrel and wherein the blow nozzle channel communicates with the mandrel channel.

4. Apparatus according to claim 3 including fluid pressure means to move the nozzle into engagement with the mandrel.

5. Apparatus according to claim 4 wherein the fluid pressure means is operative to constantly urge the nozzle into engagement with the mandrel.

6. Apparatus according to claim 5 wherein the fluid pressure is air pressure which acts on the nozzle and makes the nozzle act as an air piston.

7. Apparatus according to claim 4 wherein the blow means comprises a nozzle assembly which includes the blow nozzle and a support block.

8. Apparatus according to claim 7 including means for moving the blow nozzle and support block into engagement with the mandrel.

9. Apparatus according to claim 7 wherein the support block is fixed and the nozzle is movable in the support block, including means for moving the nozzle in the support block.

10. Apparatus according to claim 9 wherein the means for moving the nozzle is fluid pressure means.

11. Apparatus according to claim 7 including a plate means engaging the nozzle and a tie rod engaging the plate means wherein said plate means and tie rod are operative to move the nozzle out of engagement with the mandrel.

12. Apparatus according to claim 1 wherein said means for determining the position of the stretch rod is an encoder which signals the stretch rod position to a programmable controller operatively connected to the source of fluid pressure.

13. Apparatus according to claim 12 including a high pressure inlet valve connected to the controller and activated thereby to transmit fluid pressure to the parison.

14. Apparatus according to claim 1 wherein the stretch rod is carried by a sliding plate activated by the servo electric drive.

15. Apparatus according to claim 14 including a belt means connected to said sliding plate and activated by the servo electric drive.

16. Apparatus according to claim 1 including a plurality of said stretch rods and a plurality of blow molds with each blow mold operatively coupled with a separate stretch rod.

17. Apparatus according to claim 1 wherein the stretch rod engages the top of a blow nozzle in the retracted position operative to insure that the nozzle is fully retracted.

18. Apparatus according to claim 17 wherein the stretch rod has an enlarged head portion and the nozzle has a recessed head portion engagable therewith.

* * * * *